United States Patent [19]
Moore

[11] 3,902,816
[45] Sept. 2, 1975

[54] SELF-CENTERING ARTICULATED JOINT
[75] Inventor: Thomas S. Moore, Northville, Mich.
[73] Assignee: Ford Motor Company, Dearborn, Mich.
[22] Filed: Dec. 23, 1974
[21] Appl. No.: 535,930

[52] U.S. Cl. ................ 403/114; 403/129; 403/137
[51] Int. Cl.² ........................................ F16C 11/06
[58] Field of Search .......... 403/129, 114, 128, 137, 403/113, 138, 135, 136, 144, 125

[56] References Cited
UNITED STATES PATENTS
| | | | |
|---|---|---|---|
| 1,798,530 | 3/1931 | Haigh | 403/144 X |
| 3,090,642 | 5/1963 | Gottschald et al | 403/135 |

*Primary Examiner*—Andrew V. Kundrat
*Attorney, Agent, or Firm*—Clifford L. Sadler; Keith L. Zerschling

[57] ABSTRACT

The present disclosure relates to a joint for use in a motor vehicle steering linkage system and includes a socket in which the flat head of a stud is positioned. The head has a transverse ridge that is seated in a transverse recess formed on a tiltable ramp member which, in turn, is supported within the socket. A spring urges the head into engagement with the ramp member. The interengagement of the ridge and the recess inhibits rotation of the stud from a position corresponding to straight-ahead alignment of the vehicle's front wheels. The joint provides a positive means for centering the steering linkage and returning the linkage to the straight-ahead position after small angle steering wheel movement.

11 Claims, 10 Drawing Figures

3,902,816
FIG.1
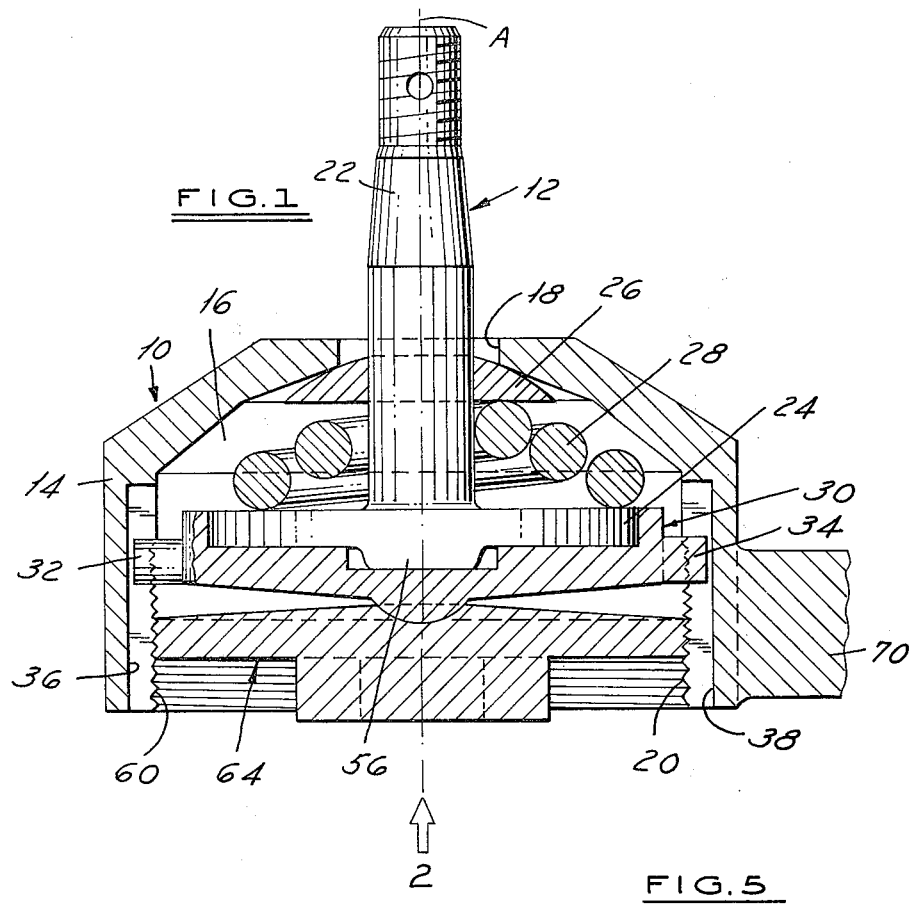
FIG.2
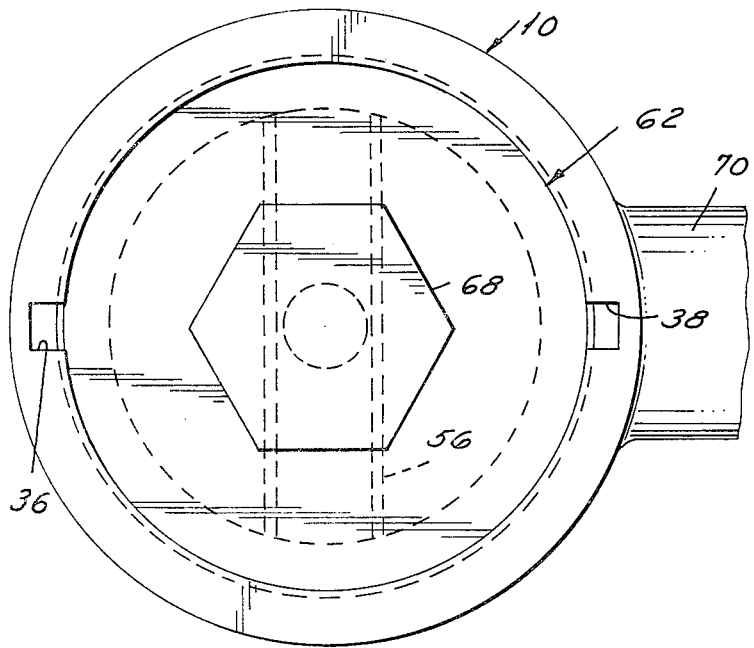
FIG.5
FIG.4
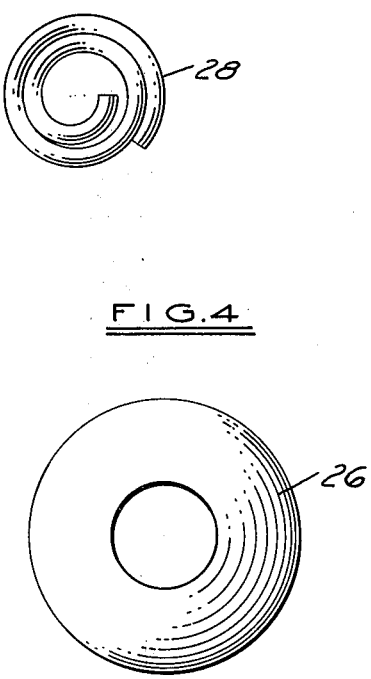

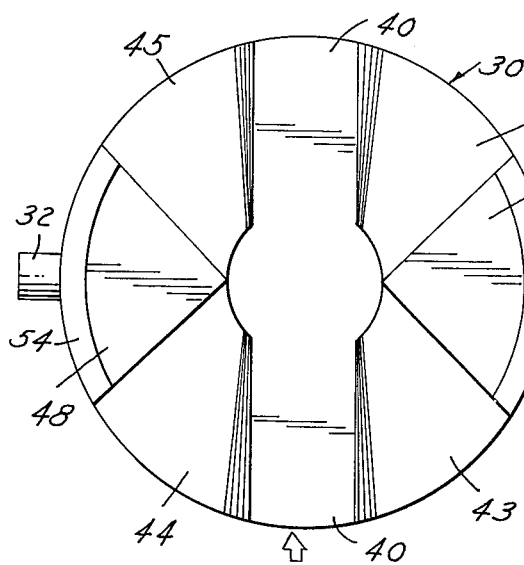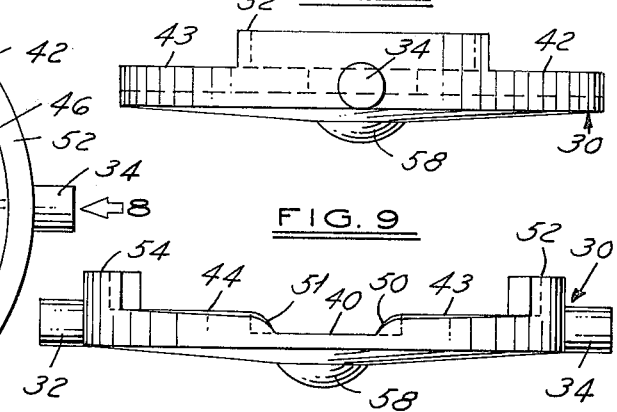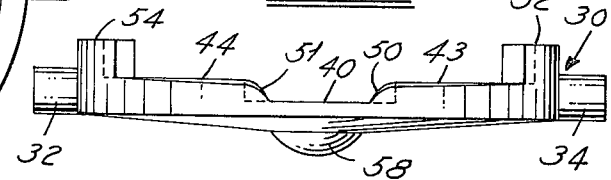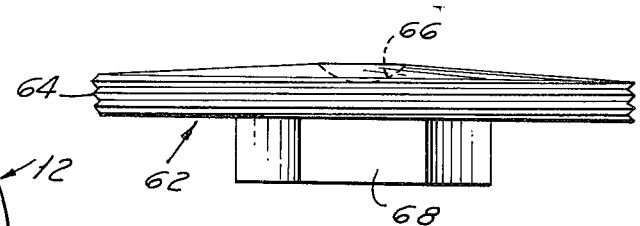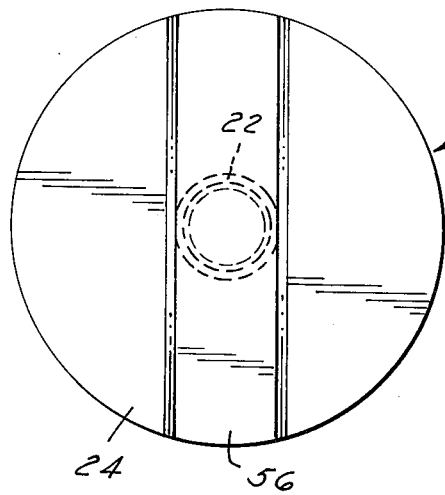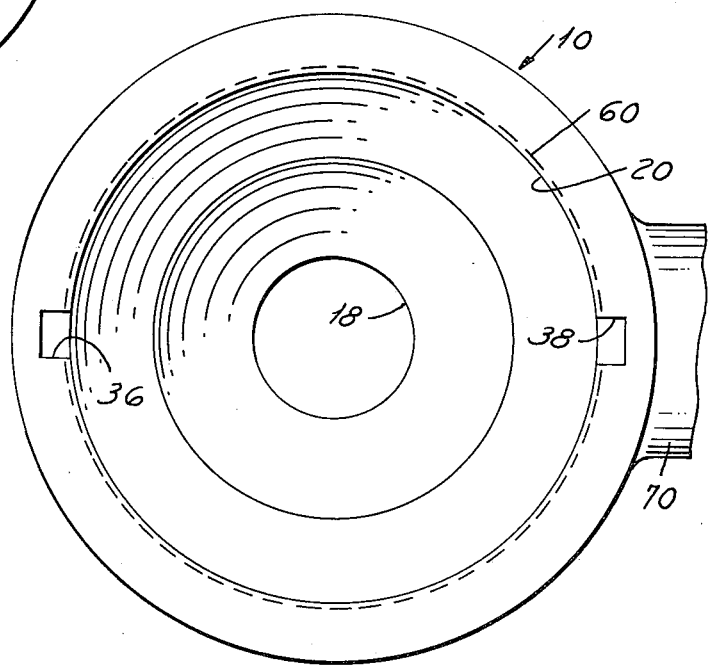

SELF-CENTERING ARTICULATED JOINT

BACKGROUND AND SUMMARY OF THE INVENTION

The purpose of the present invention is to provide a joint for a motor vehicle steering linkage system having improved small angle steering wheel returnability for improved vehicle straight-ahead stability.

According to the presently preferred embodiment of the invention a joint for a motor vehicle steering linkage system includes a socket having a hollow interior and small and large openings. A stud has a generally flat head positioned within the interior of the socket and a shank extending through the smaller opening. The head rests upon a ramp member which engages grooves in the wall of the socket to prevent rotation of the ramp about a first axis extending through the centers of the small and large openings. The ramp member rests upon a closure member fitted into the large opening of the socket and is free to tilt about axes perpendicular to the first axis.

The flat head of the stud has a transverse ridge that is seated in a transverse recess of the ramp member. The edges of the recess and the edges of the ridge are inclined to form ramps. A spring urges the head into engagement with the ramp member.

When the stud is rotated about the axis of the shank, the ridge will be forced out of the groove in the ramp member. This will cause axial displacement of the stud against the compression of the spring whereby rotation of the stud will be resisted. Due to the inclination of the edges of the ridge and the recess, the head of the stud will tend to return to a position where the ridge is seated in the recess, under the force of the spring, when edges are in engagement.

This joint may be used as a connection between the pitman arm and the cross link of a vehicle steering system. It will provide a positive force tending to maintain the steering system in a central or straight-ahead condition. Minor displacements of the linkage system and corresponding displacement of the stud head of the joint will bring the inclined edges of the ridge and recess into engagement and this will result in the linkage system being urged back to a central position. Upon major displacement such as when turning a corner, the ridge will be displaced free of the recess and no centering force will be present.

BRIEF DESCRIPTION OF THE DRAWINGS

The many objects and advantages of an articulated joint for a motor vehicle steering system constructed in accordance with this invention will become apparent upon consideration of the following detailed discussion and the accompanying drawings, in which:

FIG. 1 is a sectional view of a joint embodying the preferred form of this invention.

FIG. 2 is a bottom view of the joint of FIG. 1 taken in the direction of arrow 2.

FIG. 3 is a bottom plan view of the socket portion of the joint.

FIG. 4 is a top plan view of the bushing.

FIG. 5 is a top plan view of the conical spring.

FIG. 6 is a bottom plan view of the head of the stud.

FIG. 7 is a top elevational view of the ramp member.

FIG. 8 is a side elevational view of the ramp member taken in the direction of arrow 8 of FIG. 7.

FIG. 9 is a side view of the ramp member taken in the direction of arrow 9 of FIG. 7.

FIG. 10 is a side elevational view of the closure member.

DETAILED DESCRIPTION OF THE PREFERRED EMBODIMENT

Referring now to the drawings, FIG. 1 discloses a joint for a motor vehicle steering linkage system constructed in accordance with the presently preferred form of this invention. The joint of FIG. 1 includes a socket 10 in which a stud 12 is tiltably supported. The socket 10 has a wall 14 that defines a hollow interior portion 16. A small opening 18 is situated at one end of the interior 16 and a large opening 20 is situated at the other end of the interior.

The stud 12 has a shank portion 22 and a generally flat head portion 24. The head 24 is situated within the interior 16 of the socket 10 and the shank 22 extends through the small opening 18. An annular bushing 26 surrounds the shank 22 and slideably engages the interior surface 16 of the socket 10 adjacent the small opening 18. A conically wound coil spring 28 is interposed between the bushing 26 and the head 24 of the stud 12.

The spring 28 urges the head 24 into engagement with a ramp member 30 which forms a support therefor. The ramp member 30 is generally of a disc shape and has a pair of pivot pins 32 and 34 that extend from diametrically opposite sides. The pins 32 and 34 are received in grooves 36 and 38 formed in the interior of the wall 14 of the socket 10. Axis A extends through the centers of the small opening 18 and the large opening 20. The grooves 36 and 38 are arranged parallel to the axis A.

The upper surface of the ramp member 30 has a recess 40 that extends generally transversely to the axis A. Situated adjacent the transverse recess 40 are segmental sloping surfaces 42, 43, 44 and 45. Positioned between the surface portions 42 and 43 is a pie-shape flat surface 46 and positioned between the surface portions 44 and 45 is another pie-shape surface 48. The depth of the transverse recess 40 is generally flat. It merges with the sloping surfaces 42, 43, 44 and 45 by means of ramp portions 50 and 51 as seen in FIG. 9. Arcuate walls 52 and 54 extend along the outer perimeter of the pie-shape portions 46 and 48.

Referring to FIG. 6, the bottom surface of the head 24 of the stud 12 is generally flat except for a transversely extending ridge 56. In the assembled joint of FIG. 1, the flat surface on the bottom of the head 24 of the stud 12 is seated in flush engagement with the flat surfaces 46 and 48 of the ramp member 30. The head 24 is contained between the arcuate walls 52 and 54. The ridge 56 of the head 24 is seated in the groove 40 of the ramp 30. The segmental surfaces 42, 43, 44 and 45 each have a nominal inclination of approximately 2 degrees to the plane of the surfaces 46 and 48. Therefore, the flat bottom surface of the stud head 24 does not engage the segmental surfaces 42, 43, 44 and 45.

The bottom of the ramp member 30 has a conical shape with a central protruding hemispherical portion 58.

The internal surface of socket 10 is threaded as at 60 adjacent the large opening 20 to accommodate a closure member 62. The closure member 62 is of generally disc shape and has a threaded edge 64 that engages the threads 60 of the socket 10. The upper surface of the closure 62 has a shallow conical configuration with a central recess 66. The bottom of the closure member 62 is provided with a nut-shape hexagonal protrusion 68.

In the assembled condition of the joint as seen in FIG. 1, the closure member 62 is tightened so that the protrusion 58 of the ramp member 30 is seated in the recess 66. The closure member 62 is threaded into the socket 10 to cause the ramp 30 to force the stud head 24 to compress the spring 28.

The socket 10 is provided with an attachment portion 70 for securing it to an element of a motor vehicle steering linkage system such as a steering cross link. The stud 12 is designed to be connected to the pitman arm of a steering gear.

OPERATION

When a vehicle having the present joint as part of its steering linkage is traveling in a straight-ahead condition, the ridge 56 of the stud 12 will be seated in the transverse recess 40 of the ramp member 30 as seen in FIG. 1. In the event the steering wheel of the vehicle is turned through a few degrees the stud 12 will be angularly displaced about the axis A. This will cause the edges of the ridge portion 56 of the stud to engage the inclined or ramp edges 50 and 51 of the ramp member 30. Further angular displacement of the stud 12 will produce axial displacement of the stud relative to the ramp member 30 as the edges of the ridge 56 move along the inclined surfaces 50 and 51. Such axial displacement will be against the force of the spring 28 and, therefore, will be resiliently resisted. By the same token when the force tending to rotate the stud 12 is removed from the steering wheel, the spring 28 will urge the stud back to a central position when the edges of the ridge are in engagement with the inclined ramp edges 50 and 51 of the recess 40.

When the stud 12 is rotated to an extent that the ridge 56 is free of the inclined edges 50 and 51, the ridge will be supported on portions 43, 45 or 42, 44 of the ramp member 30 depending upon the direction in which the stud is rotated. The surfaces 43, 45, 42 and 44 are inclined at a slight angle of approximately 2 degrees in the preferred embodiment. This angle is not sufficient to produce a force which will automatically return the stud to a central position but it will facilitate the general operation of the joint.

The stud 12 is supported on the ramp member 30 and is tiltable with respect to the socket 10 because the ramp member is tiltable. The engagement of the pins 32 and 34 of the ramp 30 with the grooves 36 and 38 of the socket 10 prevent the ramp 30 from rotating about the axis A. The ramp 30, however, is free to tilt about an axis passing through the centers of the pins 32 and 34 or about a horizontal axis that is perpendicular to such axis. The engagement of the protruding portion 58 with the recess 66 in the closure plate 62 facilitates the tilting movement of the ramp member 30.

In summary, the joint of FIG. 1 provides returnability for small angular displacements (such as 10 to 15 degrees) of the stud 12. The returnability is provided by the compressive force of the spring 28 when the ridge 56 is moved out of the groove or recess 40. For major angular movement of the stud 12 (such as displacements greater than 15 degrees) the center effect of the vehicle's front wheels will provide a returning force that will bring the stud 12 back within the range where the ridge 56 and the groove 40 with its sloping edges 50 and 51 will be effective to complete the return movement.

The closure member 62 threadedly engages the socket 10 and provides a means for varying the preload of the spring 28 so that the restorative force can be adjusted.

The foregoing description presents the presently preferred embodiment of this invention. Details of construction have been set forth for purposes of illustration and not limitation. Modifications and alterations may occur to those skilled in the art that will come within the scope and spirit of the following claims.

I claim:
1. An articulated joint having a socket and a stud,
    said socket having a wall defining a hollow interior and an opening,
    a stud having a head member disposed in said interior of said socket and a shank portion extending through said opening,
    a support member supported within said socket against angular displacement relative to said socket about an axis extending generally perpendicularly through said opening,
    said support member engaging said head member,
    one of said members having a transverse recess portion and the other of said members having a complementary protruding portion extending into said recess portion,
    said stud being rotatably displaceable about the longitudinal axis of said shank portion from a first position in which said protruding portion is seated in said recess portion to a second position in which said protruding portion and said recess portion are spaced apart,
    said recess portion and said protruding portion interengaging so as to inhibit rotatable displacement of said stud from said first position to said second position.
2. An articulated joint according to claim 1 and including:
    one of said recess portion or said protruding portion having an inclined edge forming a ramp surface whereby angular displacement of said stud from said first position to said second position will cause said stud to move axially relative to said support member.
3. An articulated joint according to claim 1 and including:
    one of said members being axially displaceable in said socket,
    resilient means urging said head member and said support member into engagement.
4. An articulated joint according to claim 1 and including:
    one of said members being axially displaceable in said socket,
    resilient means urging said head member and said support member into engagement,
    one of said recess portion or said protruding portion having an inclined edge forming a ramp surface constructed to cause said stud to move axially relative to said support member in response to angular displacement of said stud from said first position to said second position.

5. An articulated joint according to claim 1 and including:
means connecting said support member to said socket constructed to support said support member for tiltable movement about an axis extending perpendicular to said axis extending generally perpendicularly through said opening.

6. An articulated joint according to claim 1 and including:
one of said members being axially displaceable in said socket,
resilient means urging said head member and said support member into engagement,
pivot means connecting said support member to said socket constructed to support said support member for tiltable movement about an axis extending perpendicular to said axis extending generally perpendicularly through said opening.

7. An articulated joint having a socket and a stud,
said socket having a wall defining a hollow interior,
said socket having a small opening and a large opening at the ends of said interior,
said stud having a generally flat head disposed in said interior and a shank extending through said small opening,
a support member disposed in said hollow interior,
pivot means connecting said support member to said wall,
said pivot means being constructed to prevent angular displacement of said support member relative to said socket about a first axis extending through the centers of said small opening and said large opening,
one of said head or said support member having a transversely extending ridge and the other of said head or said support member having a complementary recess,
said stud being rotatably displaceable about said first axis from a first position in which said ridge is seated in said recess to a second position in which said ridge is not seated in said recess,
said recess and said ridge being interengaging so as to inhibit rotatable displacement of said stud from said first position to said second position,
closure means engaging said socket at said large opening and having bearing means engaging said support member,
said bearing means of said closure means being constructed to support said support member for tilting movement relative to said socket about a second axis extending perpendicular to said first axis.

8. An articulated joint according to claim 7 and including:
said stud being axially displaceable in said socket,
resilient means urging said head and said support member into engagement.

9. An articulated joint according to claim 8 and including:
an annular bushing surrounding said shank and engaging the interior surface of said wall adjacent said small opening,
a coil spring operatively interposed between said bushing and said head constructed to urge said head into engagement with said support member.

10. An articulated joint according to claim 7 and including:
one of said recess or said ridge having an inclined edge forming a ramp surface,
said ramp surface being constructed to cause said stud to move axially relative to said support member in response to angular displacement of said stud from said first position to said second position.

11. An articulated joint suitable for use in a steering linkage system of a motor vehicle having a socket and a stud,
said socket having a wall defining a hollow interior,
said socket having a small opening and a large opening at the ends of said hollow interior,
said stud having a generally flat head disposed in said hollow interior and a shank extending from one side of said head through said small opening,
a ramp member disposed in said hollow interior and means connecting said ramp member to said wall constructed to prevent angular displacement of said ramp member relative to said socket about a first axis extending through the centers of said small opening and said large opening,
a closure member threadedly engaging said socket at said large opening and having bearing means engaging said ramp member,
an annular bushing means surrounding said shank and slideably engaging the interior surface of said wall,
spring means interposed between said bushing means and said head constructed to urge the other side of said head into engagement with one side of said ramp member,
said other side of said head having a generally flat surface with a transversely extending ridge,
said one side of said ramp member having a transversely extending recess with inclined ramp edges,
said stud being rotatably displaceable about said first axis from a first position in which said ridge is seated in said recess to a second position in which said ridge is not seated in said recess,
said inclined ramp edges being constructed to cause said stud to be displaced axially against the force of said resilient means when said stud is rotatably displaced from said first position to said second position,
said closure member being constructed to support said ramp member for tilting movement about a second axis extending perpendicular to said first axis,
said threaded engagement between said closure member and said socket providing a means to permit said closure member to be rotated relative to said socket to vary the preload of said resilient means.

* * * * *